(12) United States Patent
Freeman

(10) Patent No.: US 6,314,459 B1
(45) Date of Patent: Nov. 6, 2001

(54) HOME-NETWORK AUTOCONFIGURATION

(75) Inventor: Lawrence Alexander Freeman, Mountain View, CA (US)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/133,622

(22) Filed: Aug. 13, 1998

(51) Int. Cl.⁷ .................................................. G06F 15/177
(52) U.S. Cl. ........................................... 709/220; 709/310
(58) Field of Search .................................... 709/310–332, 709/200–253

(56) References Cited

U.S. PATENT DOCUMENTS

| | | | |
|---|---|---|---|
| 5,867,665 | * | 2/1999 | Butman et al. ........................ 709/239 |
| 5,867,667 | * | 2/1999 | Butman et al. ........................ 709/249 |
| 5,884,035 | * | 3/1999 | Butman et al. ........................ 709/128 |
| 6,026,430 | * | 2/2000 | Butman et al. ........................ 709/203 |
| 6,098,116 | * | 8/2000 | Nixon et al. ............................. 710/8 |

FOREIGN PATENT DOCUMENTS 2305271    4/1997    (GB) .............................. G06F/11/14

OTHER PUBLICATIONS

Interactive Week, Jul. 20, 1998, "Sun Calls On Jini To Simplify Network Use" as found on the http://www8.zdnet.com/intweek/print/980720/338318.html.
PC Magazine Online, Jul. 21, 1998, "Dreaming of Jini", as found on the Internet at http://www.zdnet.com/pcmag/news/trends/t980721b.html.
EP 0816969A Sun Microsystems Inc. Jan. 7, 1998. 4 line 8–18, col. 11 line 45, col.12 line 9–figure 1, col. 20 line 25–37, col. 22 line 18–32, col. 24 line 53, col 26. line 17.
IBM: "Distributed SOM (DSOM)" SOM Objects Developer Toolkit Users p. 1–1V, 601–690 XP002047926 Guide XX,XX.

* cited by examiner

Primary Examiner—St. John Courtenay, III
(74) Attorney, Agent, or Firm—Peter Verdonk

(57) ABSTRACT

Two PC's are automatically configured in a network in order to share resources registered at the individual PC's. Services and resources local to one PC are registered with the other PC and vice versa. The registry hides whether a service or resource is remote or local. In operational use of the network, a resource or service local to one PC is addressable from the remote PC as if it were local to the latter. A home network of PC's is configured automatically in this manner.

18 Claims, 7 Drawing Sheets

HOME-NETWORK AUTOCONFIGURATION

FIELD OF THE INVENTION

The invention relates to a method and system for networking information processing sub-systems. The invention relates especially to configuring a network of PC's in the home environment.

BACKGROUND ART

A known technology of networking devices is Jini of Sun Microsystems. Jini is a Java-based software technology that assists in networking PC's and peripherals. When plugged into a network, a Jini-enabled device will broadcast its presence. Network clients that are ready to use that device can request the necessary software from the device, bypassing a server or a network administrator. This architecture builds on top of an existing network. The network itself is assumed to have been configured in advance.

OBJECT OF THE INVENTION

Nowadays, an increasing number of households have more than one PC. Even so, the PC's are not networked together because this is well beyond the capability of the average user. Even an OS such as Windows95, which has a very easy device sharing model, is still too difficult to configure. Therefore, there is a need to assists the user in networking PC's.

What is needed to make home networking ubiquitous is, according to the inventor, autoconfiguration of shared resources. That is, when two or more machines are connected the resources should be automatically shared without any effort by the user. To enable autoconfiguration of shared resources and shared services in a PC network requires that the following problems be solved: detection a new network connection; assignment of a network address without user intervention; and a implementing a resource/service sharing protocol.

The first problem relating to the detection has been solved by plug-and-play technology. For example, the Windows95 OS allows many Ethernet cards / token ring cards to work automatically upon insertion in the system. The second problem relating to address assignment is currently being worked on in the industry. A known solution is a configuration management protocol, an example of which is the DHCP protocol (Dynamic Host Configuration Protocol) that lets network administrators manage central and automate the assignment of Internet Protocol (IP) addresses in an organization's network. An object of the invention is to provide a solution for the third problem, that is, for the implementing of a sharing protocol.

SUMMARY OF THE INVENTION

To this end, the invention provides a method of enabling sharing a first resource or a first service, which is registered with a first information processing sub-system (e.g., a first PC), with a second information processing sub-system (e.g., a second PC). The method comprises enabling the second sub-system to be informed about access to the first sub-system and enabling registering with the second sub-system of a first interface to the first sub-system and addressable through the second sub-system. The method further comprises enabling sharing with the first sub-system, a second resource or a second service registered with the second sub-system, enabling the first sub-system to be informed about access, to the second sub-system; and enabling registering with the first sub-system of a second interface to the second sub-system and addressable through the first sub-system. Each of the sub-systems sets up as an interface proxy client for access to the other sub-system and a proxy server for handling requests from other sub-systems proxy server.

The registering of services and resources of one PC at the other one through the proxy clients thus enables automatic configuration of a network in order to share resources. The registering hides the idea whether a resource or a service is local or is residing at another apparatus. In other words, the invention uses the registering as a tool for autoconfiguration of a network.

Jini focuses on the process of adding a device to the network and broadcasting information about the device to other machines. In this way, Jini provides a "Lookup" service that allows applications on other machines to use the newly added device. The approach of Jini assumes the network and operating system have already been configured so that each computer already knows about other computers. Jini's functionality occurs at a layer above the network. It does not, for example, solve the problems of automatic configuration of the network upon connection, disconnection, or reconnection. It assumes that the network is up or down, independent of Jini. Jini leverages the services provided by the network to implement its services. In other words, the invention uses the registering as a tool for autoconfiguration

BRIEF DESCRIPTION OF THE DRAWINGS

The invention is explained by way of example and with reference to the accompanying drawing wherein.

Throughout the figures, same reference numerals indicate similar or corresponding features.

PREFERRED EMBODIMENTS

Figure 1:
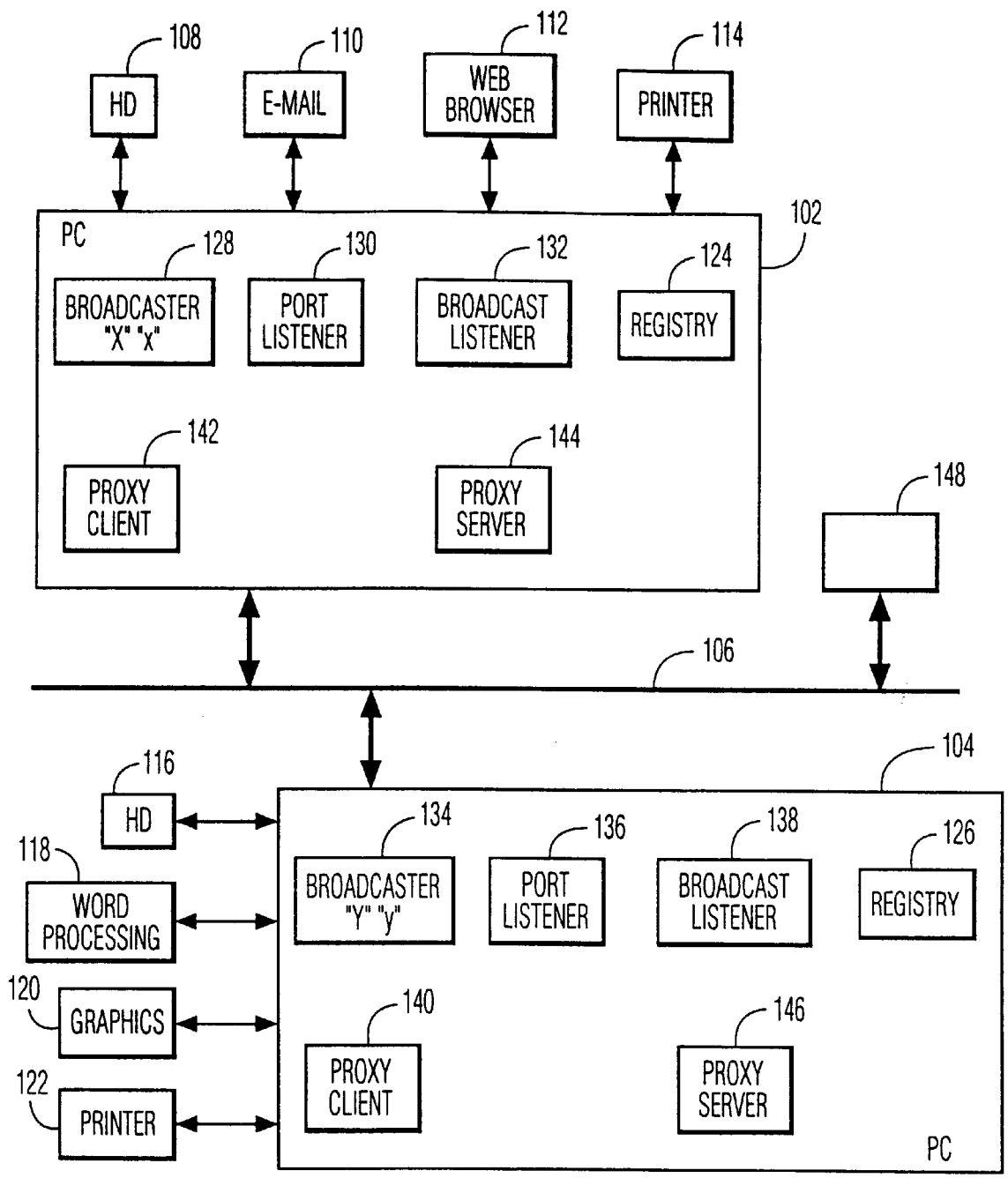
FIG. 1 is a diagram of the configuration of a system of the invention.

FIG. 1 is a block diagram with the main components of an operational system 100 in the invention System 100 comprises a first PC 102 and a second PC 104 coupled via a bus 106. Bus 106 may be a wired bus or a wireless bus or a combination thereof. PC 102 has resources and provides services. For example PC 102 has a hard drive 108, an email capability 110, a web browser 112, a printer 114, etc. Similarly, PC 104 has resources and services, such as a hard drive 116, a wordprocessing service 118, a graphics program 120, a printer 122, etc. The terms "resource" and "service" are used interchangeably below for the sake of brevity.

PC 102 has a registry 124 for registering interfaces to resources and services 108–114 local to PC 102. Applications running on PC 102 can get access to these interfaces. The interfaces handle the messages or requests to local resources or services 108–114. Similarly, PC 104 has a registry 126 for registering interfaces to resources and services 116–122 local to PC 104.

PC 102 further comprises the following entities that are concurrent and may be threads or processes: a broadcaster 128, a port listener 130 and a broadcast listener 132. Similarly, PC 104 has a broadcaster 134, a port listener 136 and a broadcast listener 138. PC 102 further comprises a proxy client 142 and a proxy server 144. PC 104 has a proxy client 140 and a proxy server 144. Proxy client 142 communicates with proxy server 146, and proxy client 140 communicates with proxy server 144. The roles played by components 124–138 in the autoconfiguration of system 100, and the roles of proxy servers 146 and 144 and proxy clients 142 and 140 are explained with reference to FIGS. 2–7.

Figure 2:
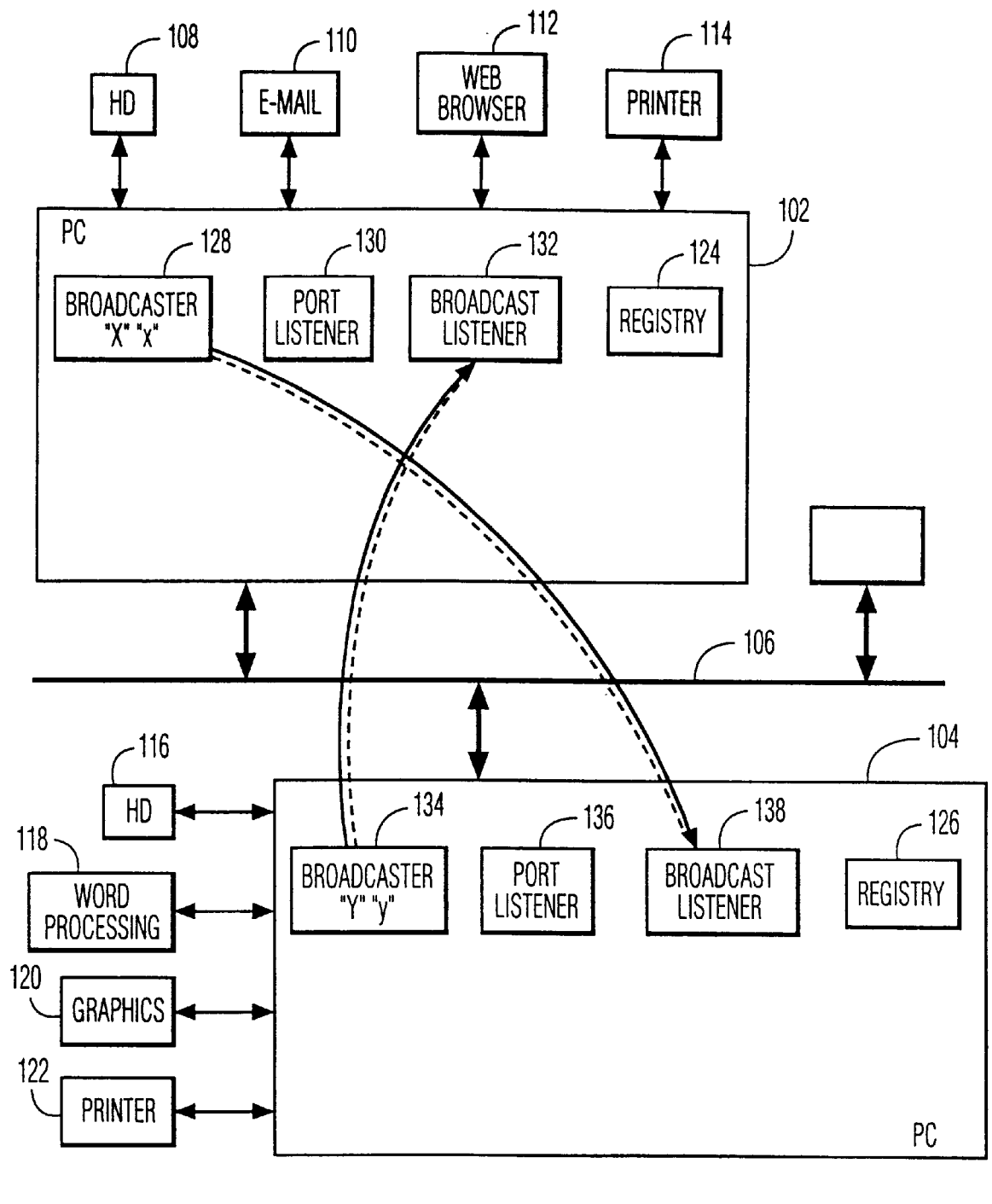
FIGS. 2–7 are diagrams illustrating various steps in the autoconfiguration process and during operational use.

FIG. 2 is a diagram of the initial configuration of system 100 when PC's 102 and 104 have been functionally connected to bus 106. In this configuration, broadcasters 128 sends out on bus 106 a network address for PC 102, say "X", and a port number, say "x", on an established channel. Similarly, broadcaster 134 sends out a broadcast on bus 106 with a network address for PC 104, "Y", and a port number "y" on another established channel. Broadcast listener 138 of PC 104 receives the message broadcasted by PC 102. Broadcast listener 132 of PC 102 receives the message broadcasted by PC 104.

Figure 3:
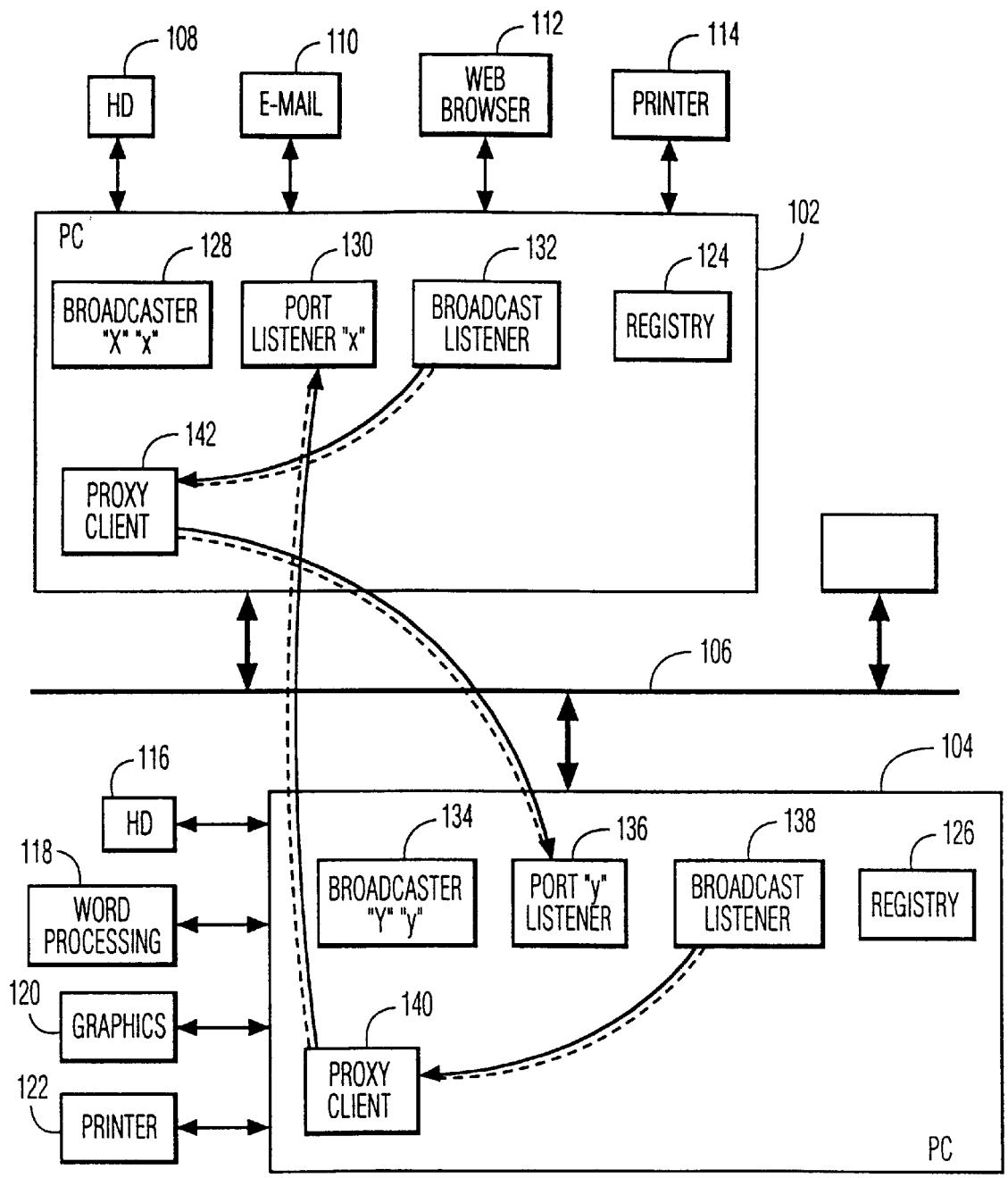

FIG. 3 illustrates a next step of the autoconfiguration process. Having received the broadcast message from PC 104, broadcast listener 132 of PC 102 generates a proxy client 142. Proxy client 142 thereupon establishes a connection with port listener 136 of PC 104 at port "y". Similarly, broadcast listener 138 of PC 104 generates proxy client 140 that establishes a connection with port listener 130 at port "x".

Figure 4:
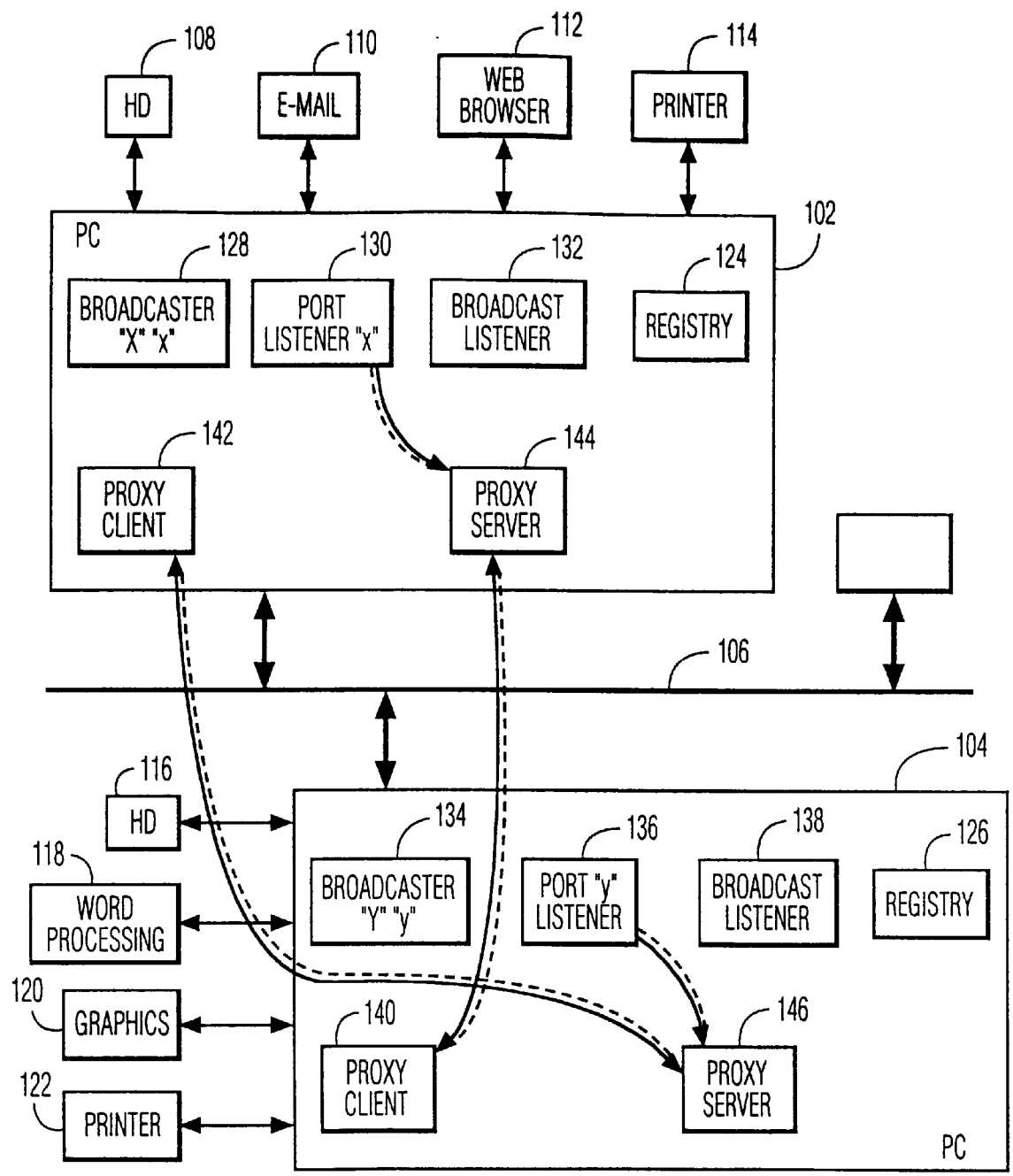

FIG. 4 shows a further step in the autoconfiguration process. Port listener 130 starts up a proxy server 144 to handle requests from remote client 140. Proxy server 144 sends information about resource 108–114, e.g., as contained in registry 124, to proxy client 140. Proxy client 140 registers this information with registry 126. Similarly, port listener 136 starts up a proxy server 146 to handle requests from remote client 142. Proxy server 146 sends information about resources 116–122 to proxy client 142, which thereupon registers this with registry 124.

Figure 5:
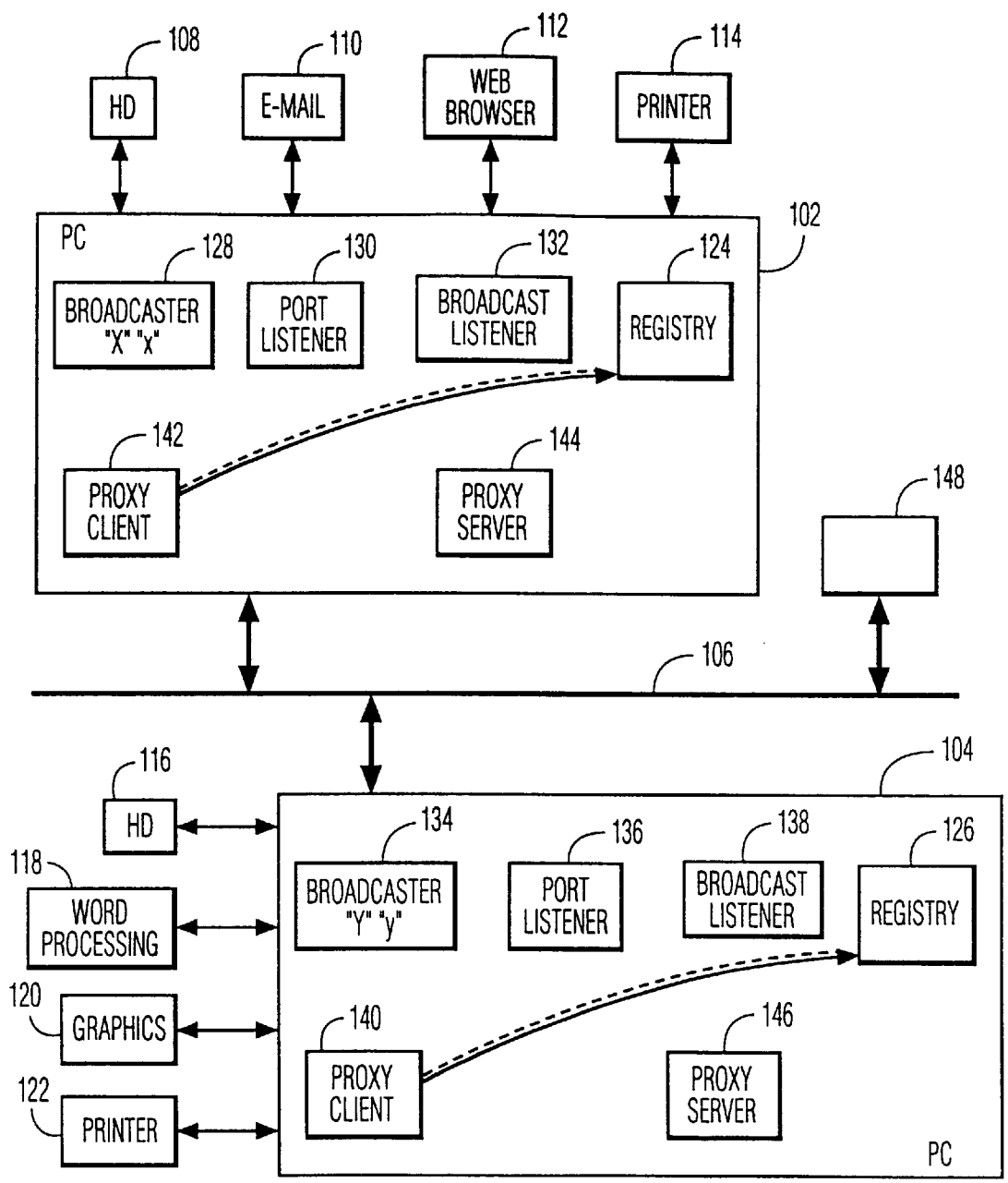

FIG. 5 shows the step wherein proxy client 142 registers with registry 124 as a local service for each resource or service available in registry 126, and wherein proxy client 140 registers with registry 126. for each resource or service available in registry 124. The result is that PC 102 has now copied its registry 124 specifying the addresses of its local resources and services to PC 104, where the copy is added to registry 126. Similarly, PC 104 has copied its registry 126 to PC 102 where it gets added to registry 124 Both PC's 102 and 104 have now been registered with each other. When a third PC 148 is connected to bus 106, a process similar as the one discussed above occurs automatically. Registries 124 and 126 thus hide the idea of whether a resource or a service is local or is residing at another apparatus. Each of the addresses in registry 124 is unique throughout registry 124. Similarly, each of the addresses in registry 126 is unique throughout registry 126. A user working at PC 102 and requesting a local resource or service, i.e., one of resources or services 108–114 has the request passed on directly to the resource or service requested indicated by the corresponding address in registry 124. When the user requests a remote service or remote resource, i.e., one of resources or services 116–122 that is local to remote PC 104, the request is forwarded to proxy client 142 and processed by proxy server 146 as discussed below with reference to FIG.7.

Figure 6:
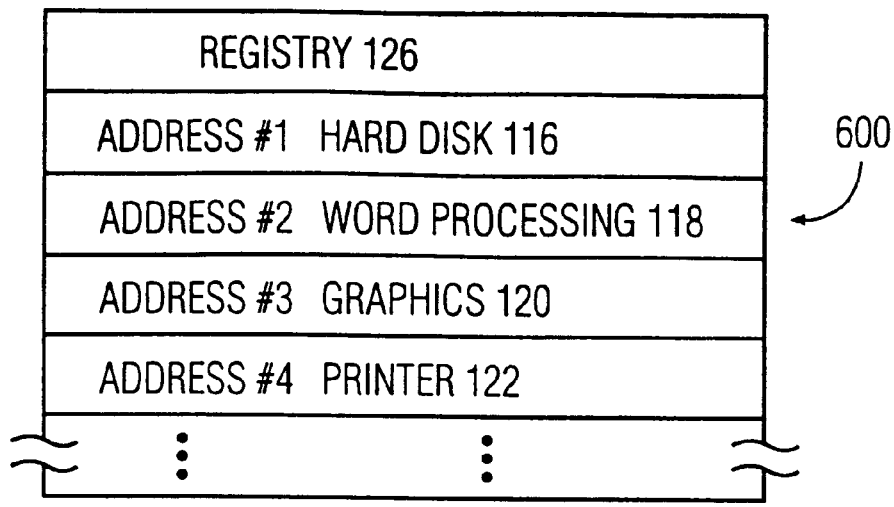
Figure 6:
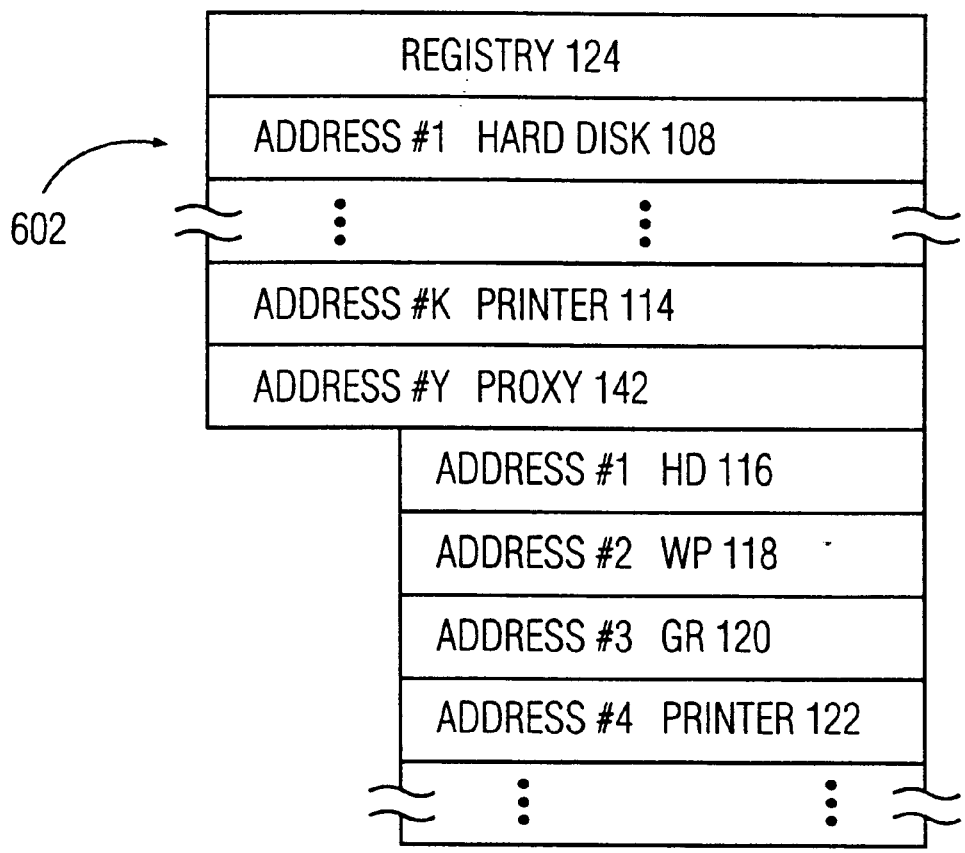

FIG. 6 gives diagrams 600 and 602 as an example of the registering of proxy client 142 with registry 124. Diagram 600 represents initial registry 126 with a list of local resources and services available at PC 104 and their respective local addresses. Diagram 602 represents registry 124 after client 142 has registered with it. Registry 124 initially comprises the list of resources and services 108–114 with local addresses #1 to #K. After client 142 has registered, registry 124 has an entry for PC 104 as proxy device at address #Q. Remote resources and services 116–122 now have addresses dependent on address #Q.

Figure 7:
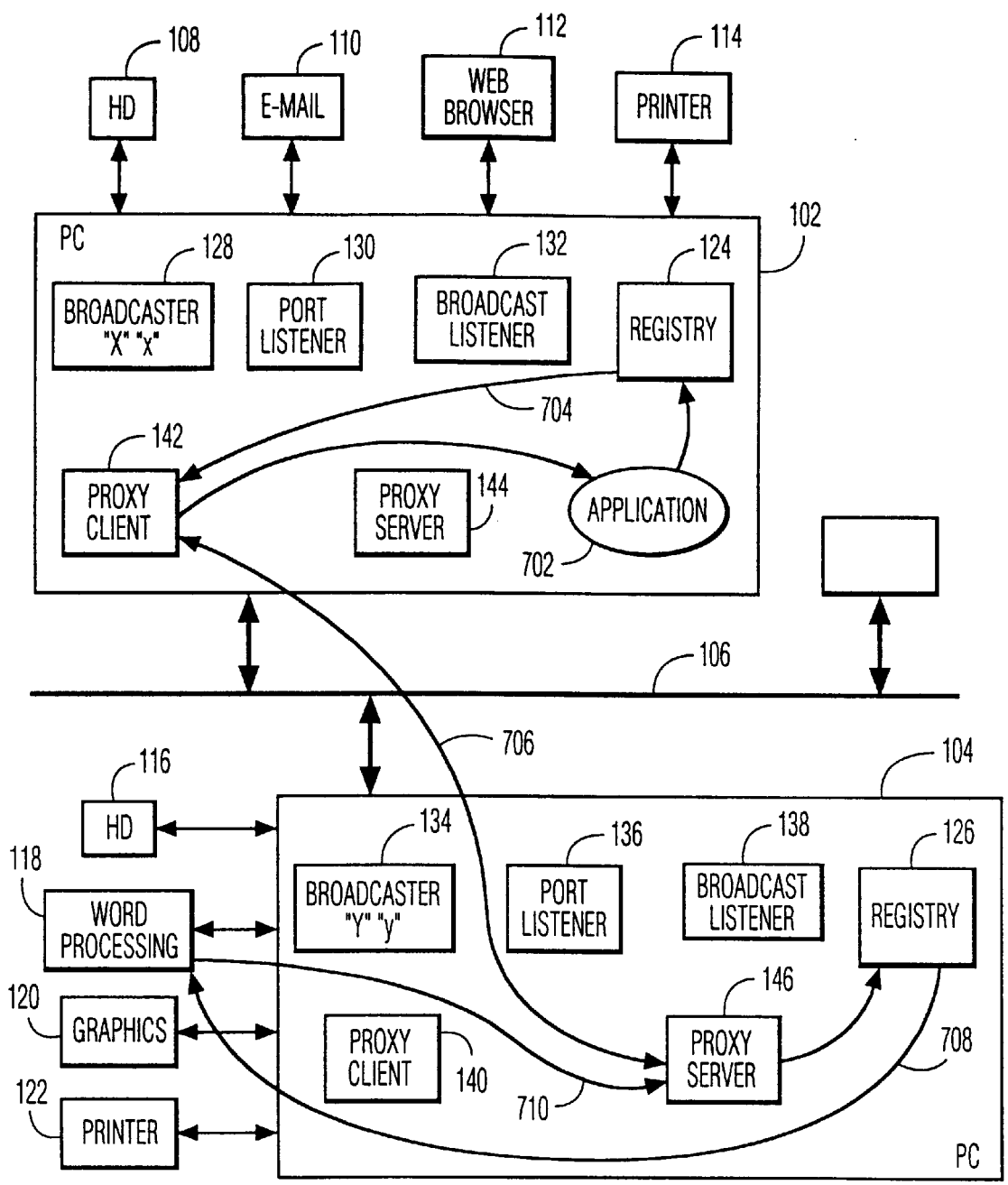

FIG. 7 illustrates this address-based operation involving proxy client 142 and proxy server 146. A software application 702 running on PC 102 generates a request for resource 118 at remote PC 104. A reference to resource 118 has been added to registry 124 as discussed above. The reference has a pointer (arrow 704) to proxy client 142. Proxy client 142 on PC 102 contacts (arrow 706) proxy server 146 on remote PC 104. Proxy server 146 has an address, or: handle, (arrow 708) to resource 118 via local registry 126. Results of the processing by resource 118 are routed back (arrow 708) via proxy server 146 and proxy client 142 (arrow 706) to application 702 (arrow 712). Proxy client 142 and proxy server 146 serve as a pipe.

If a request or message generated at PC 102 has an address for one of local resources or services 108–114, the message gets passed on directly to the service or device driver (not shown) of the relevant resource. In case the address is not local, e.g., refers to resource 118 at PC 104, the message is sent (702) to proxy client 142, which in turn passes on (704) the request to proxy server 146 at the dedicated port. Proxy server 146 processes the request and routes it (706) to the relevant one of resources 116–122 via registry 126. The result of the request being processed is then communicated (708) from proxy server 14 to proxy client 142 from which the result is routed to, e.g., a local application at PC 102 or a display driver (not shown) local to PC 102.

If the connection between the two PC's breaks, the address of remote clients 142 and 140 can be removed from local registries 124 and 126, respectively.

The means for establishing the autoconfiguration as described above: broadcaster, port listener, broadcast listener, registry, proxy client and proxy server are installed on, initially, stand-alone PC's 102 and 104, e.g., as part of their operating systems or as applications that run on top of the operating system The autoconfiguration means gets used when stand-alone PC 102 or 104 is connected to a network or when stand-alone PC's 102 and 104 are connected together. The software is provided to users, for example, as a program on a diskette or is made downloadable from the web.

An implementation of this autoconfiguration system can be demonstrated using a java-based system. In this scenario, two stand-alone PC's have java, a network card, and a TCP/IP stack installed on their machines. For purposes of using TCP/IP, a respective random IP number is used for each respective one of the machines. The idea here is that the IP address and standard TCP/IP settings have not been pre-configured by the user. In addition to this IP address, a unique id (UID) is generated—this could be a random number of sufficient complexity so that a collision is statistically improbable (a working exams of this is Microsoft's Global Unique IDentifier [GUID]). The IP address is used to allow TCP/IP to identify each PC and the UID is used to ensure that the randomly generated IPs are not the same. This is established since the same IP address must necessarily be connected to the same UID.

In the java system, a runtime executable is started that spawns off three objects: a Broadcaster, a Broadcast Listener, and a Port Listener—each as a java thread. In this case, the Broadcast Listener could use a java multicast socket to subscribe to a multicast. Likewise, the Broadcaster could also use a java multicast socket to send information to a multicast group. The Port Listener could be implemented as a java ServerSocket.

If the Broadcast Listener receives a message and the IP address is the same as its own IP address and the UID is not the same, it brings down each of its Proxy Servers, randomly generates a new IP address, and automatically reconfigures itself. In this way, the IP addresses of each machine are eventually ensured to be unique.

If the Broadcast Listener receives a message and the IP address is the same as its own IP address and the UID is the same, then the message is ignored since the message was generated by its own Broadcaster.

If the Broadcast Listener receives a message and the IP address is different and this IP address the not been encountered before, then a new java thread is generated: a Proxy Client which connects to the Port Listener on the other machine. The broadcast message contains port and IP address for the Proxy Client to connect as a java Socket. Upon receiving this request, the Port Listener through the java accept( ) method spawns a new java thread to handle this request: a Proxy Server. Resource information flows from the Proxy Server to the Proxy Client back to the registry.

For purposes of this java example, the registry can be organized as a hash table, where each resource is identifiable by a unique address generated when the resource or service is added to the registry. When the Proxy Client first connects to the Proxy Server, the Proxy Server sends information about the current registry. The Proxy Client then adds this information to the registry local to the Proxy Client. For purposes of this example, the important idea is that a handle gets associated with the Proxy Client in the registry, so that the process or thread local to the new address is the Proxy Client rather the a local process or thread. When the service is used, control information is passed to the Proxy Client which passes this same information to the Proxy Server which then passes this information to the resource or service on the other machine.

In the case of the java implementation, each of these services consists of a java object that receives.

ByteData either from another object using the service or resource or from the Proxy Server. In this way, both the client application using the service and the service itself appear local on the same machine.

The important idea behind the registry used is that it associates services/resources with addresses and it takes packets of data which it transmits to the appropriate service or resource based on this address In the case of the java implementation, this data is passed using a java data input streams and data output streams.

If the connection between the two PC's breaks, the address of remote clients 142 and 140 can be removed from local registries 124 and 126, respectively. For example, a heartbeat protocol between the PC's ensures that each is kept aware of the other until the heartbeat of one of the PC's disappears. A timer expires and automatically triggers the procedure to disable the registry's entry to the relevant client.

I claim:

1. An information processing system (100) with a first information processing sub-system (102) coupled to a second information processing sub-system (104), wherein:

the first sub-system has a first registry (124) for registering at least a first resource (108–114) local to the first sub-system;

the second sub-system has a second registry (126) for registering at least a second resource (116–122) local to the second sub-system;

the first sub-system has a first proxy client (142) registered with the first registry; and the second sub-system has a second proxy server (146) for communicating with the first proxy client and for access of the second resource.

2. The system of claim 1, wherein:

the second sub-system has a second proxy client (140) registered with the second registry; and the first sub-system has a first proxy server (144) for communicating with the second proxy client and for access of the first resource.

3. The system of claim 1, wherein the first sub-system comprises a first PC, and wherein the second sub-system comprises a second PC.

4. An information processing sub-system (102) comprising:

a registry (124) for registering a resource (108–114) local to the sub-system;

a broadcasting module (128) for broadcasting a message;

a broadcast listener (132) for receiving a response from another information processing sub-system in response to the other sub-system having received the message, and for creating a proxy client (142) thereupon;

wherein:

the proxy client is being registered with the registry as a representative of the other sub-system for the sub-system to access another resource local to the other sub-system.

5. The sub-system of claim 4, further comprising a port listener (130) for in response to receiving a further message from the other sub-system creating a proxy server (144) for enabling the other sub-system to access the resource local to the sub-system.

6. The sub-system of claim 4, comprising a PC.

7. A method for enabling sharing with a first information processing sub-system (102) a second resource (116–122) registered with a second information processing sub-system (104), the method comprising:

enabling the first sub-system to be informed about access to the second sub-system; and enabling registering with a registry of resources that are local to the first sub-system a second interface to the second resource for access to the second resource from the first sub-system.

8. The method of claim 7, wherein enabling the first sub-system to be informed about access to the second sub-system comprises:

enabling the second sub-system to broadcast a message with an IP address and with a port number;

enabling the first sub-system to set up, in response to the message, a proxy client (142) for communicating with a port of the second sub-system indicated by the port number; and enabling the second sub-system to set up a proxy server (146) to handle a request from the proxy client for access to the second resource.

9. The method of claim 7, further comprising:

enabling sharing with the second sub-system a first resource (108–114) registered with the first sub-system;

enabling the second sub-system to be informed about access to the first sub-system; and enabling registering with the second sub-system of a first interface to the first resource for access to t first resource from the second sub-system.

10. The method of claim 9, wherein:
enabling the first sub-system to be informed about access to the second sub-system comprises:
    enabling the second sub-system to broadcast a message with an IP address and with a port number;
    enabling the first sub-system to set up, in response to the message, a proxy client (142) for communicating with a port of the second sub-system indicated by the port number; and
    enabling the second sub-system to set up a proxy server (146) to handle a request from the proxy client for access to the second resource; and wherein enabling the second sub-system to be informed about access to the first sub-system comprises:
    enabling the first sub-system to broadcast a further message with a further IP address and with a further port number;
    enabling the second sub-system to set up, in response to the further message, a further proxy client (140) for communicating with a further port of the first sub-system indicated by the further port number; and
    enabling the first sub-system to set up a further proxy server (144) to handle a further request from the further proxy client for access to the first resource.

11. The method of claim 8, wherein the first and second sub-systems each comprise a respective PC.

12. The method of claim 10, wherein the first and second sub-systems each comprise a respective PC.

13. A method for enabling a first information processing sub-system (102) to address a resource (116–122) registered with a second information processing sub-system (104), the method comprising:
    enabling creating a proxy client (142) at the first sub-system for communication with the second sub-system, the proxy client being representative of the resource;
    enabling registering the proxy client as a local resource with a registry (124) for further resources local to the first sub-system;
    enabling creating a proxy server (146) at the second information processing sub-system for handling a request from the proxy client.

14. The method of claim 13, comprising enabling the second information processing sub-system to address a further resource (108–114) registered with the first information processing sub-system, the method further comprising:
    enabling creating a further proxy client (140) at the second sub-system for communication with the first sub-system, the further proxy client being representative of the further resource;
    enabling registering the further proxy client as a further local resource with a further registry (126) of the second sub-system;
    enabling creating a further proxy server (144) at the first information processing sub-system for handling a further request from the further proxy client.

15. The method of claim 13, wherein the first and second sub-systems each comprise a respective PC.

16. The method of claim 14, wherein the first and second sub-systems each comprise a respective PC.

17. A method of enabling a user to configure a home network with a first information processing sub-system and a second information processing sub-system, wherein:
    a first resource local to the first sub-system is registered with a first registry of the first sub-system;
    a second resource local to the second sub-system is registered with a second registry of the second sub-system; and
    the method comprises:
        enabling creating a proxy client at the first sub-system for communication with the second sub-system, the proxy client being representative of the second resource;
        enabling registering the proxy client as a local resource with the first registry; and
        enabling creating a proxy server at the second information processing sub-system for handling a request from the proxy client.

18. A software application for implementing a method of enabling a user to configure a home network with a first information processing sub-system and a second information processing sub-system, wherein:
    a first resource local to the first sub-system is registered with a first registry of the first sub-system;
    a second resource local to the second sub-system is registered with a second registry of the second sub-system; and
    the method comprises:
        enabling to create a proxy client at the first sub-system for communication with the second sub-system, the proxy client being representative of the second resource;
        enabling to register the proxy client as a local resource with the first registry; and
        enabling to create a proxy server at the second information processing sub-system for handling a request from the proxy client.

* * * * *